United States Patent [19]

Kuramochi et al.

[11] 4,044,556
[45] Aug. 30, 1977

[54] HYDRAULIC TORQUE CONVERTER WITH A LOCK-UP CLUTCH

[75] Inventors: Koujirou Kuramochi; Kiyoshi Ohnuma, both of Toyota, Japan

[73] Assignee: Toyota Jidosha Kogyo Kabushiki Kaisha, Toyota, Japan

[21] Appl. No.: 683,284

[22] Filed: May 5, 1976

[30] Foreign Application Priority Data

Dec. 26, 1975  Japan .................. 50-157478

[51] Int. Cl.² ............... F16D 33/00; F16D 33/20
[52] U.S. Cl. .................... 60/361; 192/3.28
[58] Field of Search ............. 60/361, 362, 364, 367, 60/435; 74/664, 720; 192/3.28, 3.29, 3.33

[56] References Cited

U.S. PATENT DOCUMENTS

| | | | |
|---|---|---|---|
| 3,002,593 | 10/1961 | Black et al. | 192/3.29 |
| 3,503,209 | 3/1970 | Loffelholz | 60/361 |
| 3,953,970 | 5/1976 | Fuehrer | 60/361 X |

*Primary Examiner*—Edgar W. Geoghegan
*Attorney, Agent, or Firm*—Birch, Stewart, Kolasch & Birch

[57] ABSTRACT

A hydraulic torque converter with a lock-up clutch wherein the cross section of a torus formed by an impeller, turbine and a stator is determined to satisfy that the ratio of its axial length L to its radial height H (L/H) is 0.64–0.80, the ratio of its inner diameter $D_i$ to its outer diameter $D_o$ ($D_i/D_o$) is 0.40–0.33 and the ratio of an annular flow passage area a at the exit of the impeller to a circular area A defined by the torus outer diameter (a/A) is 0.18–0.23.

1 Claim, 1 Drawing Figure

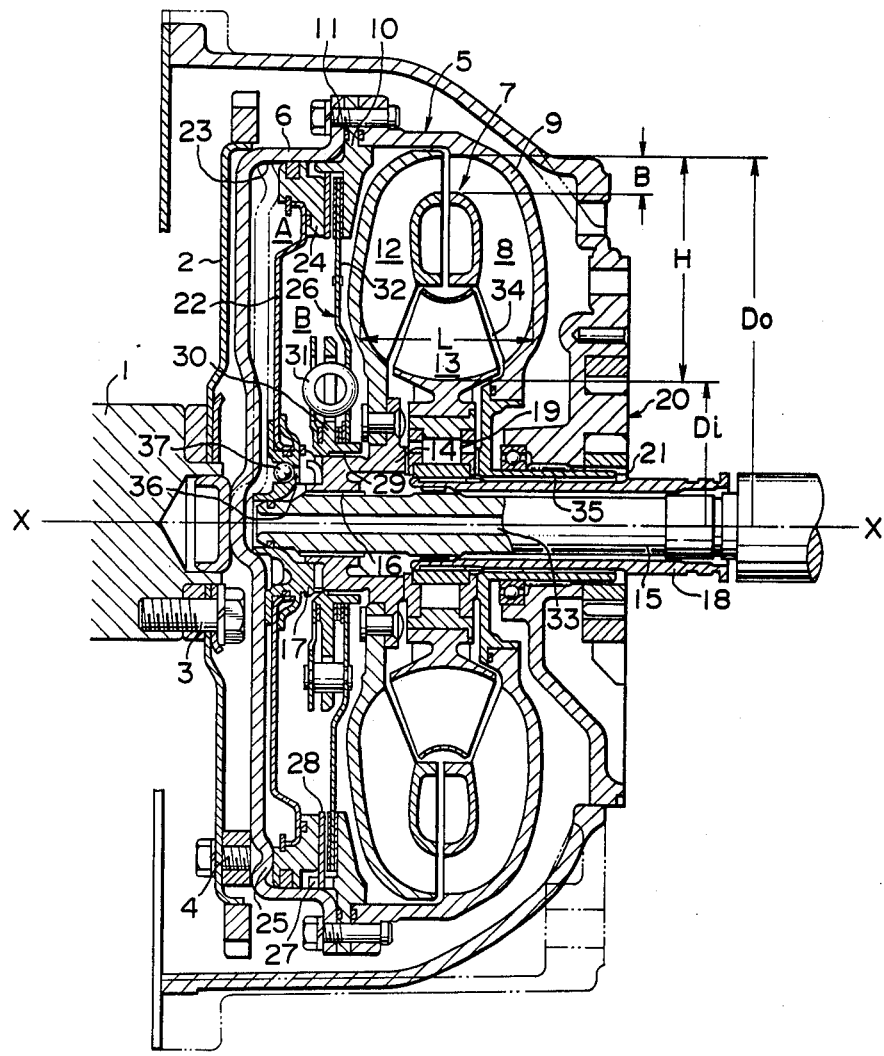

HYDRAULIC TORQUE CONVERTER WITH A LOCK-UP CLUTCH

BACKGROUND OF THE INVENTION

1. Field of the Invention

The present invention relates to a hydraulic torque converter with a lock-up clutch.

2. Description of the Prior Art

A trilock type hydraulic torque converter generally used as a hydraulic transmission for automobiles comprises an impeller connected with an engine output shaft, a turbine connected with a gear transmission and a stator adapted to divert fluid flow from said turbine to said impeller so as to effect a proper conversion of torque in accordance with the difference in rotational speed between the engine output shaft and the input shaft of said gear transmission, whereby the power is transmitted therethrough by way of fluid. In this type of hydraulic torque converter, even under the operating condition that the rotational speed of the turbine is closest to that of the impeller, there exists inevitably a slippage between the turbine and the impeller thereby causing a relatively lower transmission efficiency when compared with the direct transmission by means of a mechanical clutch, thus resulting in an increase in fuel consumption which is disadvantageous in view of the natural resource economy and the emission of harmful components in the exhaust gases. To meet with this problem, a hydraulic torque converter equipped with a lock-up clutch has been proposed, wherein a mechanical clutch means is provided in parallel with a hydraulic torque converter means, said mechanical clutch being selectively actuated in accordance with the operational condition of the automobile so as to make the best use of the advantages provided by the hydraulic torque converter and the mechanical clutch. As well known in the art, the hydraulic torque converter with a lock-up clutch is adapted to effect transmission by the hydraulic converter system when the automobile is accelerated or a change-over of the gear transmission is effected without actuating the mechanical clutch and to directly mechanically connect the impeller with the turbine by the lock-up clutch in other operating conditions so that the power is directly transmitted without depending upon a hydraulic transmission. In a hydraulic torque converter equipped with a lock-up clutch, the operation of the hydraulic torque converter is somewhat different from that of a hydraulic torque converter without a lock-up clutch and, therefore, the hydraulic torque converter with a lock-up clutch requires a particular performance different from that which is suitable for a normal hydraulic torque converter without a lock-up clutch.

One of the requirements with regard to the torque converter performance of a hydraulic torque converter equipped with a lock-up clutch is that the torque converter capacity in a range of low speed ratio may be relatively small when compared with that in a range of high speed ratio with the effect that the torque ratio is relatively high thereby obtaining better performance for acceleration and mobility in view of the fact that since the lock-up clutch is actuated except when the automobile is running at a low speed, the maximum efficiency in the converter operating range may be relatively lower than that in a hydraulic torque converter without a lock-up clutch.

Another particular requirement for the performance of the hydraulic torque converter with a lock-up clutch is that the torque converter capacity in a range of high speed ratio should be relatively larger so that the slippage between the impeller and the turbine is reduced as far as possible thereby improving the transmission efficiency. This is due to the fact that when the automobile is running at a low speed, there is a limit for allowing the transmission to operate depending upon the actuation of the lock-up clutch thereby requiring transmission via fluid if engine stoppage or car backing is to be avoided.

Still another particular requirement with regard to the performance of the hydraulic torque converter equipped with a lock-up is an ability of rapidly shifting from a range of low speed ratio to a range of high speed ratio or a characteristic that the difference in the torque converter capacity between the ranges of low speed ratio and high speed ratio is small so that a shock caused by the actuation of the lock-up clutch is reduced.

Furthermore, the hydraulic torque converter with a lock-up clutch has an inherent drawback that its axial dimension is relatively large due to an axial combination of a lock-up clutch and a hydraulic torque converter, thereby causing a spacial disadvantage when a hydraulic converter with a lock-up clutch is mounted in an automobile.

SUMMARY OF THE INVENTION

The object of the present invention is to provide an improved hydraulic torque converter with a lock-up clutch which satisfies the aforementioned requirements and is also advantageous in view of an extension of the overall axial dimension of the hydraulic torque converter caused by the incorporation of a lock-up clutch therein.

According to the present invention, the above-mentioned object is accomplished by a hydraulic torque converter comprising an input member including an impeller, an output member including a turbine, a reaction member including a stator, and a lock-up clutch adapted to mechanically connect said input member with said output member, wherein the improvement comprises that a torus formed by said impeller, said turbine and said stator is so dimensioned that the ratio of its axial length L to its radial height H (L/H) is substantially from 0.64 to 0.80, the ratio of its inner diameter $D_i$ to its outer diameter $D_o$ ($D_i/D_o$) is substantially 0.40 to 0.33 and the ratio of an annular flow passage area $a$ at the exit of the impeller to a circular area A defined by the torus outer diameter ($a/A$) is substantially from 0.18 to 0.23.

By employing a hydraulic torque converter satisfying the abovementioned dimensional conditions, the input moment for driving the impeller is lowered, thereby increasing the stall rotational speed, i.e. the impeller rotational speed under the condition that the turbine rotation is locked and the throttle valve is fully opened, a high torque converter efficiency is ensured and the operation is rapidly shifted from a range of low speed ratio to a range of high speed ratio, wherein the high speed ratio becomes closer to 1.

Furthermore, since the sectional configuration of the torque converter according to the present invention is relatively flat in the axial direction thereof, the overall axial dimension of the composite structure of a hydraulic torque converter and a lock-up clutch is smaller than the conventional hydraulic torque converter with a lock-up clutch, thereby providing an advantage when the converter is mounted in an automobile.

BRIEF DESCRIPTION OF THE DRAWING

The accompanying drawing is a longitudinal section of an embodiment of the hydraulic torque converter with a lock-up clutch according to the present invention.

DESCRIPTION OF THE PREFERRED EMBODIMENT

Referring to the drawing, 1 designates a rear end portion of an engine output shaft to which is mounted a fly wheel 2 by a plurality of bolts 3. The fly wheel 2 is connected with a housing means generally designated by 5 by means of a plurality of bolts 4 thereby providing an assembly composed of the engine output shaft 1, the fly wheel 2 and the housing means 5 simultaneously rotatable about an axis X—X. The housing means 5 not only serves to contain therein essential portions of the hydraulic torque converter with a lock-up clutch, but also constitutes an essential power transmission element as it is rotated about said axis X—X by being driven by said engine output shaft. The housing means 5 includes an end wall portion 6 at which the housing means is connected with the fly wheel 2 by the bolts 4 and an impeller housing portion 9 forming an impeller 8 which constitutes a part of a trilock type hydraulic torque converter generally designated by reference numeral 7. At a portion where said end wall portion 6 and the rear impeller housing portion 9 are connected, an annular clutch element 10 is mounted to extend radially inwardly from the inner wall of the housing means. Said annular clutch element is mounted in a manner that its annular flange portion is interposed between said end wall portion and the rear impeller housing portion and fastened together by a plurality of bolts 11. The trilock type hydraulic torque converter 7 further comprises a turbine 12 and a stator 13 in addition to the aforementioned impeller 8 thereby providing a torus formed of these three elements.

The turbine blades are supported by a turbine hub 14 thereby forming a turbine rotor, said hub being mounted on an output shaft 15 extending along the central axis X—X by way of spline means 16. A forward end portion (leftward end as seen in the FIGURE) of the output shaft 15 is fluid-tightly engaged by a flexible disc hub 17 mounted to said housing end wall portion 6, while a rear end portion (rightward end as seen in the FIGURE) of the output shaft is formed as an input shaft of a planetary gear transmission mechanism (not shown). A sleeve 18 is provided around the output shaft 15, said sleeve supporting a stator wheel supporting the stator blades by way of a one-way clutch 19. A rear end portion of the housing member 5 is, after having formed an impeller rotor supporting the impeller blades, further extended rearward in the form of a hollow shaft 21 for an oil pump 20 so that the oil pump is driven directly in accordance with the rotation of the engine output shaft.

The torus formed by said impeller 8, turbine 12 and stator 13 has a relatively flattened cross sectional contour having radial height H larger than axial length L. According to the present invention, the ratio of L/H is selected to be substantially from 0.64 to 0.80. Furthermore, according to the present invention, the torus is dimensioned so that the ratio of its inner diameter $D_i$ to its outer diameter $D_o$ ($D_i/D_o$) is substantially from 0.40 to 0.33 and the ratio of an annular flow passage area $a$ (shown by B in the figure) at the exit of the impeller to a circular area A defined by the torus outer diameter ($a/A$) is substantially from 0.18 to 0.23.

By making the ratio L/H smaller, the torque converter capacity in a low speed ratio region becomes relatively small when compared with that of a torque converter having a circular torus cross sectional contour. However, the reduction of the torque converter capacity is limited in view of the efficiency thereby giving a lower limit for the ratio, while an upper limit for the ratio is determined by a substantial effectiveness in the reduction of the torque converter capacity and the reduction in the axial dimension of the device. Based upon consideration of these factors, it has been found that the ratio L/H should preferably be substantially from 0.64 to 0.80.

The ratios $D_i/D_o$ and $a/A$ are determined in relation to the value of the ratio L/H, wherein an upper limit is given in view of the efficiency of the torque converter, while a lower limit is given in view of the reduction of the torque converter capacity principally in a high speed ratio region. Based upon consideration of these factors, it has been found that the ratio $D_i/D_0$ should preferably be substantially from 0.40 to 0.31 and that the ratio $a/A$ should preferably be substantially from 0.18 to 0.23.

Adjacent the end wall portion 6 of the housing means 5, a flexible disc 22 is provided as supported by the hub 17 at a central portion thereof. The flexible disc 22 may be formed like a dish spring and carry an annular piston element 24 fluid tightly and slidably engaged in a cylinder 23 provided by a cylindrical portion of the housing end wall portion 6. The annular piston element 24 is biased by the spring action of the flexible disc 22 so that its front face (left end face as seen in the FIGURE) abuts against raised portions 25 formed in the end wall portion 6. By the flexible disc 22 the space confined by the housing member 5 is divided into a chamber A located on one side (leftside in the FIGURE) of the flexible disc and a chamber B located on the other side (rightside in the FIGURE) of the flexible disc.

A clutch disc generally designated by 26 is provided between the flexible disc 22 and the annular clutch element 10 extending radially inwardly from the inner peripheral surface of the housing means 5. An outer peripheral portion of the clutch disc 26 is positioned between the annular clutch element 10 and the annular piston element 24, wherein the outer peripheral portion of the clutch disc is directly engagable with the annular clutch element 10 at one surface thereof while it is opposed by an annular plate element 28 at the other surface thereof, said annular plate element being positioned between the outer peripheral portion of the clutch disc and the annular piston element 24 and guided by guide means 27 so as to be movable in axial directions while prevented from rotating around the central axis X—X. The clutch disc 26 comprises a hub 30 mounted on the turbine hub 14 by way of spline means 29 and an annular plate member 32, these two members being elastically connected by a plurality of buffering compression coil springs 31 arranged as spaced along a peripheral portion of the hub 30.

The chamber A defined on the forward side of the flexible disc 22 is fluidly connected with a passage 33 provided to extend along the central axis of the power outut shaft 15, while the chamber B defined on the rear side of the flexible disc 22 communicates through an impeller inlet space 34 to an annular fluid passage 35 defined between the sleeve 18 and the hollow shaft 21. The flexible disc 22 is formed with a through opening 36 of a predetermined throttling ratio and a ball 37 is received in said opening in a manner to provide a check valve which allows fluid to flow from chamber B to chamber A while preventing flow of fluid in the reverse direction.

In operation, when power transmission is to be fluidly effected by the operation of the hydraulic torque converter, fluid at a predetermined pressure for operating the torque converter is supplied through the passage 35 from a suitable oil pressure control means such as, for example, the one disclosed in the copending Japanese Patent Application No. 86919/75. This operating fluid flows through the impeller inlet space 34 into the annular passage defined by the impeller 8, the turbine 12 and the stator 13. The fluid further flows to the chamber B and reaches the through opening 36. Then, the fluid flows through this opening toward the passage 33 to be discharged therefrom. In this manner, when the power transmission is effected by the operation of the torque converter, a fluid flow of a predetermined rate is maintained to traverse the torque converter, thereby ensuring a normal operation of the torque converter. Under this operating condition, as a matter of fact, the direct transmission of power from the housing means 5 to the output shaft 15 through the clutch disc 26 does not occur. By contrast, in operating condition wherein the power should preferably be transmitted from the input shaft 1 directly to the output shaft 15 while bypassing the torque converter for the purpose of avoiding a power loss due to the slippage cause in the torque converter, the operating fluid is supplied to the chamber A through the passage 33 from the oil pressure control means as mentioned above. By the supply of hydraulic pressure to the chamber A, the flexible disc 22 is biased toward the chamber B against the spring force thereof, thereby driving the annular piston element 24 rightward in the FIGURE, thus pressing the outer peripheral portion of the clutch disc 26 onto the annular clutch element 10 by way of the annular plate element 28. Thus, the annular clutch element 10 and the clutch disc 26 are frictionally engaged with each other, thereby transmitting the power supplied to the housing means 5 from the input shaft 1 directly to the output shaft 15 through the annular clutch element 10 and the clutch disc 26 thereby accomplishing the locked-up condition of the hydraulic torque converter device.

Although the invention has been shown and described with respect to a preferred embodiment thereof, it should be understood by those skilled in the art that various changes and omissions in the form and detail thereof may be made therein without departing from the spirit and the scope of the invention.

We claim:

1. A hydraulic torque converter comprising an input member including an impeller, an output member including a turbine, a reaction member including a stator, and a lock-up clutch adapted to mechanically connect said input member with said output member, wherein the improvement comprises that a torus formed by said impeller, said turbine and said stator is so dimensioned that a ratio of its axial length L to its radial height H (L/H) is substantially from 0.64 to 0.80, the ratio of its inner diameter $D_i$ to its diameter $D_o$ ($D_i/D_o$) is substantially from 0.40 to 0.33, and the ratio of an annular flow passage area $a$ at the exit of the impeller to a circular area A defined by the torus outer diameter is substantially from 0.18 to 0.23.

* * * * *